(12) United States Patent
Meister et al.

(10) Patent No.: US 8,568,536 B2
(45) Date of Patent: Oct. 29, 2013

(54) FILTER CLEANING TOOL AND METHOD

(75) Inventors: Steven Meister, Chillicothe, IL (US); David Painter, Wyoming, IL (US); Dwain Kamphuis, West Olive, MI (US)

(73) Assignee: Caterpillar Inc., Peoria, IL (US)

( * ) Notice: Subject to any disclaimer, the term of this patent is extended or adjusted under 35 U.S.C. 154(b) by 387 days.

(21) Appl. No.: 12/859,555

(22) Filed: Aug. 19, 2010

(65) Prior Publication Data

US 2011/0146721 A1 Jun. 23, 2011

Related U.S. Application Data

(60) Provisional application No. 61/288,026, filed on Dec. 18, 2009.

(51) Int. Cl.
*B08B 9/00* (2006.01)

(52) U.S. Cl.
USPC .................. 134/166 R; 134/198; 15/405

(58) Field of Classification Search
None
See application file for complete search history.

(56) References Cited

U.S. PATENT DOCUMENTS

| | | |
|---|---|---|
| 4,808,234 A | 2/1989 | McKay et al. |
| 5,116,395 A | 5/1992 | Williams |
| 5,143,529 A | 9/1992 | Means, Jr. |
| 5,253,476 A | 10/1993 | Levendis et al. |
| 5,328,492 A | 7/1994 | Zievers et al. |
| 5,390,492 A | 2/1995 | Levendis |
| 5,397,550 A | 3/1995 | Marino, Jr. |
| 5,426,936 A | 6/1995 | Levendis et al. |
| 5,584,900 A | 12/1996 | Zaiser et al. |
| 5,616,171 A | 4/1997 | Barris et al. |
| 6,755,016 B2 | 6/2004 | Dittler et al. |
| 6,773,478 B1 | 8/2004 | Broering et al. |
| 7,025,811 B2 | 4/2006 | Streichsbier et al. |
| 7,047,731 B2 | 5/2006 | Foster et al. |
| 7,051,453 B2 | 5/2006 | Schmitt et al. |
| 7,357,829 B2 | 4/2008 | Ehlers |
| 7,371,266 B2 | 5/2008 | Streichsbier et al. |
| 7,384,455 B2 | 6/2008 | Sellers et al. |
| 7,393,387 B1 | 7/2008 | Heisey |
| 7,410,521 B2 | 8/2008 | Sellers et al. |

(Continued)

FOREIGN PATENT DOCUMENTS

| | | |
|---|---|---|
| AU | 0 566 276 B2 | 10/1987 |
| DE | 27 20 619 A1 | 11/1978 |

(Continued)

OTHER PUBLICATIONS

"Dalamatic® Dust Collectors," *Donaldson Company, Inc.*, 12 pages (2002).

(Continued)

*Primary Examiner* — Eric Golightly
(74) *Attorney, Agent, or Firm* — Leydig, Voit & Mayer

(57) ABSTRACT

A tool for removing particulate matter from a diesel particulate filter (DPF) includes a container defining a chamber that has an open end, and a support associated with the open end that supports a first axial end of the DPF and forms a seal around an outside surface of the can of the DPF and the container. An air nozzle mounted proximate to a second axial end of the DPF directs a narrow flow of air through the DPF that passes through a portion of the DPF element bundle and exits through the first axial end into the container.

8 Claims, 9 Drawing Sheets

(56) References Cited

U.S. PATENT DOCUMENTS

| | | | |
|---|---|---|---|
| 7,410,529 | B2 | 8/2008 | Sellers et al. |
| 7,410,530 | B2 | 8/2008 | Wagner et al. |
| 7,419,532 | B2 | 9/2008 | Sellers et al. |
| 7,462,222 | B2 | 12/2008 | Sellers et al. |
| 2003/0159436 | A1 | 8/2003 | Foster et al. |
| 2005/0011357 | A1 | 1/2005 | Crawley |
| 2006/0201326 | A1 | 9/2006 | Wagner et al. |
| 2008/0184679 | A1 | 8/2008 | Jirele et al. |
| 2009/0000471 | A1 | 1/2009 | Sellers et al. |
| 2009/0000479 | A1 | 1/2009 | Streichsbier et al. |
| 2009/0044523 | A1 | 2/2009 | Wagner et al. |
| 2009/0056288 | A1 | 3/2009 | Waldo |

FOREIGN PATENT DOCUMENTS

| | | | |
|---|---|---|---|
| DE | 33 36 918 A1 | | 4/1985 |
| DE | 43 13 132 A1 | | 10/1994 |
| DE | 19632970 A1 | * | 2/1997 |
| JP | 55051911 A | * | 4/1980 |
| JP | 55-051911 A | | 4/1982 |
| JP | 2005-046729 A | | 2/2005 |
| JP | 2005-256795 A | | 9/2005 |
| JP | 2005256795 A | * | 9/2005 |
| KR | 20-0436083 | | 5/2007 |
| WO | WO 2008/054262 A1 | | 5/2008 |
| WO | WO 2009/005663 A1 | | 1/2009 |

OTHER PUBLICATIONS

"Diesel Particulate Filter Maintenance: Current Practices and Experience," *Manufacturers of Emission Controls Association*, pp. 1-19 (Dec. 2004).

International Application No. PCT/US2006/001850, filed Jan. 18, 2006 entitled "Apparatus for Combusting Collected Diesel Exhaust Material from Aftertreatment Devices and Methods," 28 pages.

"RF Baghouse Dust Collectors," *Donaldson Company, Inc.*, 12 pages (2005).

"Off-Line Regeneration of Overloaded Ceramic Cores," Written by Bruce Hoppenstedt, *Donaldson Company, Inc.*, 14 Pages (May 23, 1991).

Cleaire Product Catalog: Horizon™, http://www.cleaire.com/site/products/horizon.html, 7 pages (May 10, 2006).

Kanaoka et al., *Advanced Powder Technol.*, "Observation of the process of dust accumulation on a rigid ceramic filter surface and the mechanism of cleaning dust from the filter surface," 10(4): 417-426 (1999).

"Diesel Particulate Filter (DPF) ash cleaning for your Caterpillar or other brand of diesel truck engine now available at Whayne," Web page from Whayne Power Systems (2007).

"Retrofit Strategies for Controlling Diesel Emissions," Presentation by Tim Taylor of Cleaire (Jul. 18, 2006).

Dartec AG AutoClean It Operations Manual (Sep. 2006).

Dartec AG corporate information (Jan. 1, 2004).

"Heavy-Duty Diesel Engine DPF Pulse Cleaner," Donaldson DPF Pulse Cleaner (Aug. 30, 2007).

CombiClean Filter Cleaning Machine—Brochure (Jan. 2006).

Faurecia DPF remanufacturing.

FSX product line.

FSX TrapBlaster 7 Pneumatic Cleaner.

SPX Service Solutions Diesel Emission Cleaning Solutions (DECS) flyer.

Cleaire Filter Cleaning System Diesel Particulate Filter Cleaning Station (Dec. 2005).

CornbiClean Step by Step Operation Guide (Jan. 2005).

Lubrizol Engine Control Systems CombiClean Diesel Particulate Filter Cleaning Station brochure (Mar. 2003).

Donaldson, "RF Dust Collectors," 4 pp. (1994).

Cleanair Systems, "The CleanAIR AeroClean" 2 pp. (2009).

Emission Control Limited, "The '8 Hour' Cleaning Cycle," 1 p. (2009).

Cawdell, "CombiClean Filter Cleaning Machine," 2 pp. (2009).

Kleenair Systems, "Filter Regeneration," 1 p. (2008).

KIPO, International Search Report in International Patent Application No. PCT/US2010/060859, 3 pp. (Aug. 31, 2011).

KIPO, Written Opinion in International Patent Application No. PCT/US2010/060859, 3 pp. (Aug. 31, 2011).

\* cited by examiner

FILTER CLEANING TOOL AND METHOD

CROSS REFERENCE TO RELATED APPLICATIONS

This patent application claims the benefit of U.S. Provisional Patent Application No. 61/288,026, filed Dec. 18, 2009, which is incorporated herein in its entirety by reference.

TECHNICAL FIELD

This patent disclosure relates generally to maintenance and service tools for internal combustion engine components and, more particularly, to service tools for removing ash accumulated on diesel particulate filters.

BACKGROUND

One of the byproducts of fuel combustion in an internal combustion engine is carbon particles, which are typically referred to as soot. Emission standards typically specify a limit to the amount of soot that an engine can emit to the environment, which limit is typically below the level of soot generated by the engine during operation. Therefore, various components and systems are employed by engine or vehicle manufacturers to control and limit the amount of soot emitted to the environment.

One device commonly used to limit the amount of soot expelled into the environment from an engine is referred to as a particulate trap or diesel particulate filter (DPF). Such a device includes a porous substrate, for example, made of ceramic material, that may be coated with various chemical compounds that alter the composition of exhaust constituents. The porosity of the substrate acts as a filter for physically trapping carbon particles or soot in an exhaust stream passing over and/or through the filter. One can appreciate that such physical removal of carbon particles from a gas stream will progressively saturate the filter with particulate matter.

A typical DPF is made of a collection of elongate filter elements arranged in bundles. Each filter element has a generally tubular shape and a polygonal cross section, for example, hexagonal or octagonal. The filtering elements are usually bundled together into a larger, typically cylindrically shaped filter, which has a generally beehive cross sectional shape. The internal surfaces of the filter elements collectively provide a relatively large surface area onto which soot and ash particles are collected.

Although soot particles are periodically removed from a DPF by an oxidation process, ash particles cannot be thus removed and collect in the DPF over time. The ash particles are typically the result of burning of lubrication oil in the engine, and their collection on the DPF diminishes the surface area for flow of exhaust gas through the DPF, thus increasing the exhaust gas restriction of the engine, which increases fuel consumption and also increases the frequency of DPF regeneration.

BRIEF SUMMARY OF THE DISCLOSURE

In one aspect, the disclosure describes a tool for removing particulate matter from a diesel particulate filter (DPF). In the illustrated embodiments, the DPF included a filter element bundle enclosed within a can that defines first and second axial ends. The tool includes a container defining a chamber that has an open end. A support associated with the open end of the container supports the first axial end of the DPF and forms a seal between an outside surface of the can of the DPF and the chamber of the container. An air nozzle mounted proximate to the second axial end of the DPF directs a narrow flow of air through the second axial end. The flow of air passes through at least a portion of the filter element bundle where it removes particulate matter from the filter bundle, and exits through the first axial end of the DPF into the container. A remaining portion of the filter element bundle filters the air exiting from the container as the air passes back through the open end of the container and the DPF.

In another aspect, the disclosure describes a method for cleaning particulate matter from a diesel particulate filter (DPF), such as a DPF that filters ash and other particulates from a stream of engine exhaust gas. The filtering function of the DPF occurs as the stream of engine exhaust gas enters a first axial end of the DPF and exits from a second axial end. The method includes blowing a narrow stream of high velocity air from the second axial end through a small portion of the filter elements of the filter and out of the first axial end. The stream of air exits the first axial end as exhausted cleaning air that carries ash and other particulate matter. The first axial end of the DPF is enclosed by a catch basin that contains the exhausted cleaning air. A flow velocity of the exhausted cleaning air is reduced within the catch basin such that a portion of the ash and other particulates falls out of the exhausted cleaning air stream and collects in the catch basin. An additional portion of the ash and other particulates is then removed from the exhausted cleaning air stream by passing the exhausted cleaning air stream into the first axial end of the DPF and out from the second axial end.

In yet another aspect, the disclosure describes a tool for removing ash and other particulate matter accumulated on a diesel particulate filter (DPF). The tool includes a catch basin adapted to receive a first end of the DPF through an open end. A support bracket is connectable to a second, opposite end of the DPF when the first end of the DPF is disposed over the open end of the catch basin. A rotatable carrier rotates relative to the support bracket and an air nozzle is slidably disposed on the rotatable carrier. The air nozzle is arranged to incrementally slide relative to the carrier when the carrier is disposed in at least one predetermined angular position relative to the support bracket. In this way, a radial position of the air nozzle is incrementally changed relative to the rotation axis. During operation, a jet of air is provided by the air nozzle. The jet of air passes through a portion of the DPF in a direction from the second end towards the first end of the DPF.

DETAILED DESCRIPTION

This disclosure relates to a system and method of removing ash that has accumulated and collected in a DPF by use of an air knife. As can be appreciated, a DPF removed from a vehicle or machine for cleaning may also include soot or other particulates accumulated thereon in addition to ash. For simplicity, when reference is made to ash in the filter hereinafter, it should be understood that the ash may also include soot or any other particulate in the DPF. Moreover, although the embodiments disclosed herein relate to a structural arrangement for cleaning a DPF that has been removed from a vehicle or machine, the principles used for cleaning the DPF may be adapted for cleaning of the DPF while it is still installed onto the vehicle or machine. Further, even though the disclosed embodiments relate to a tool that is easily transported for cleaning of DPFs in the field, it should be appreciated that the structures and methods disclosed herein are equally applicable to machines that are permanently installed in a shop for servicing machines, vehicles, or that reconditions components and systems thereof.

Figure 1:
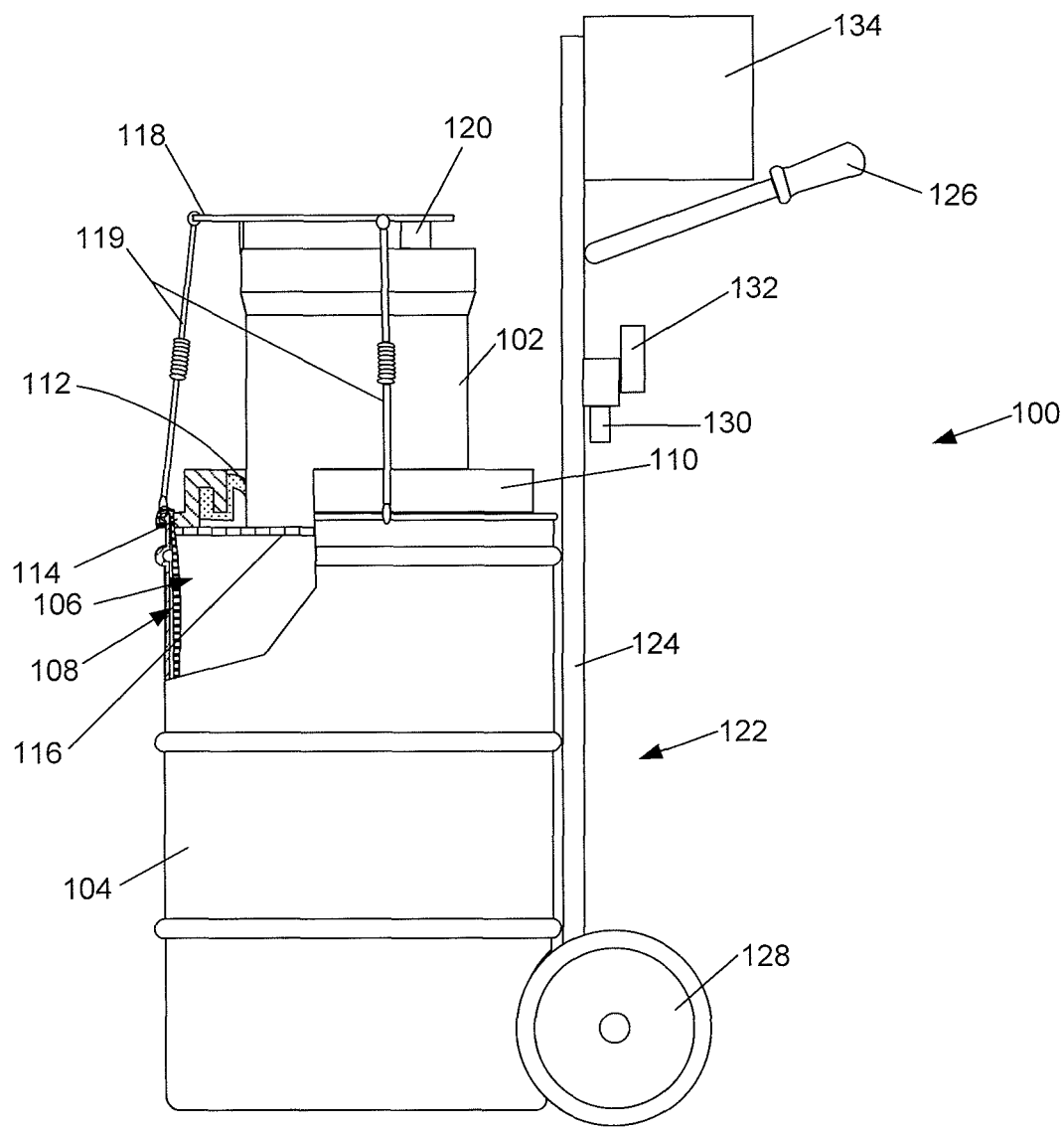
FIG. 1 is a side view in partial cross section of a first embodiment for a diesel particulate filter (DPF) ash cleaning tool in accordance with the disclosure.

With the foregoing in mind, a first embodiment of a filter cleaning tool 100 is shown in partial cross section from a side perspective in FIG. 1. As shown, the filter cleaning tool 100 has a DPF 102 connected thereto in a position for cleaning. The filter cleaning tool 100 includes a catch basin 104, which in the illustrated embodiment is made of a standard size steel barrel, for example a 30-gallon or a 55-gallon steel barrel that has been adapted for this purpose. In general, any enclosure having any shape may be used. The catch basin 104 is generally a container that is disposed beneath the DPF 102 such that ash particles separated from the DPF 102 can drop into and be collected. Thus, the catch basin 104 defines an internal collection cavity 106 into which the ash particles are collected. To facilitate cleaning of the tool 100 between DPF treatments, the catch basin 104 may include a liner 108, which can be removed after the cleaning operation of the DPF 102 has been completed and sealed for disposal of the ash that has accumulated therein. Although specialized liners for the application may be used, the liner 108 in the illustrated embodiment is a bag made of a polyethylene sheet, but other types of porous or non-porous materials may be used, such as a liner made of GORE-TEX®.

The bottom portion of the catch basin 104 is closed and defines the bottom of the collection cavity 106, but in alternate embodiments, especially those having the liner 108, it can be appreciated that the bottom of the catch basin 104 may be at least partially open to discourage the pooling of liquids, such as water. The top portion of the catch basin 104 is generally open to accommodate the bottom of the DPF 102, as is generally shown in FIG. 1. In the illustrated embodiment, an adapter collar 110 is disposed over the open end of the catch basin 104.

The adapter collar 110 supports and positions the DPF over the opening of the catch basin 104. In the illustrated embodiment, the adapter collar 110 includes a seal 112 that engages the outer portion of the DPF 102. The seal 112 is disposed on a ring portion 114 of the adapter collar 110 that fits over the opening of the catch basin 104 and supports the adapter collar 110 thereon as well as supports the weight of the DPF 102 while it is positioned over the catch basin 104. In the illustrated embodiment, the adapter collar 110 includes a horizontal tray 116, which may simply be a flange extending peripherally below the seal 112 or may alternatively be a perforated plate, mesh, or an arrangement of narrow, vertical bars. These and other air-permeable arrangements are arranged to support the DPF 102 and permit ash falling from the DPF 102 during the cleaning process to pass through the tray 116 and fall into the catch basin 104.

Figure 2:
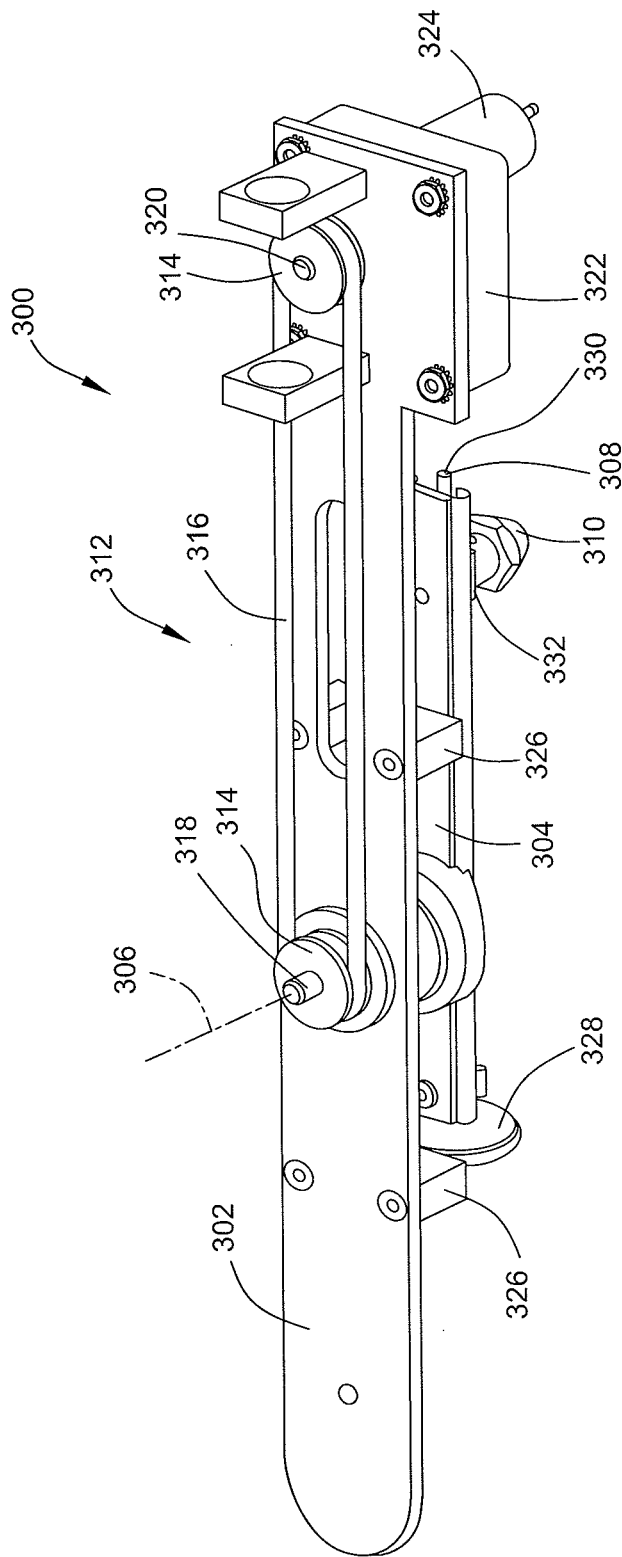
FIG. 2 is an outline view of an air knife mechanism in accordance with the disclosure.

When preparing the DPF 102 for cleaning, a portion of the tool 100 is assembled onto the top of the DPF 102 and optionally secured to a rim of the outside cylindrical housing of the DPF 102. In other words, the DPF 102 supports the cleaning head of the tool, which is described in detail relative to FIGS. 2 and 3. As shown in FIG. 1, a gantry or support bracket 118 is supported on the DPF 102 by legs 120. The legs 120 can ensure that the support bracket 118 is positioned at an appropriate distance, position, and inclination relative to the face of the DPF 102. In the illustrated embodiment, a plurality of optional straps 119 are used to secure the relative positioning of the support bracket 118 onto the DPF 102, as well as secure the DPF 102 onto the adapter ring 110 during the cleaning process. The straps 119 are optional. In general, clamps, springs, or resilient cords (not shown) may be used to secure the connection between the DPF 102 and support bracket 118 to the tool 100. As is described in more detail hereafter, the support bracket 118 permits the connection and suspension of an air knife assembly 300 (as shown in FIG. 2) above the DPF 102 such that a jet of compressed air that is provided thereby can dislodge and remove ash accumulation from within the DPF 102. The dislodged ash particles then fall into the catch basin 104 for collection.

The ash cleaning tool 100 is advantageously arranged to be portable such that filter cleaning can be accomplished in the field. This portability capability is especially valuable when servicing equipment that is either too large or too valuable to remove from a worksite. Thus, the ash cleaning tool 100 is integrated with a hand cart or dolly 122. The dolly 122 includes a frame portion 124, handle 126, and wheels 128. The dolly 122 provides mobility to the ash cleaning tool 100, and may advantageously be stored in a service truck during field service calls. The dolly 122 may further include features for providing interfaces between the components of the ash cleaning tool 100 with other systems, such as a source of compressed air (not shown) for operating the air knife, a source of power, for example, a battery or power supply to operate the various electronic systems of the tool 100, and so forth. In the illustrated embodiment, the dolly 122 includes a compressed air connection port 130, and an electrical connection lead 132. The ash cleaning tool 100 further includes an electronic controller 134 that is mounted on the dolly 122 and arranged to monitor and control the operation of the air knife assembly 300.

Figure 3:
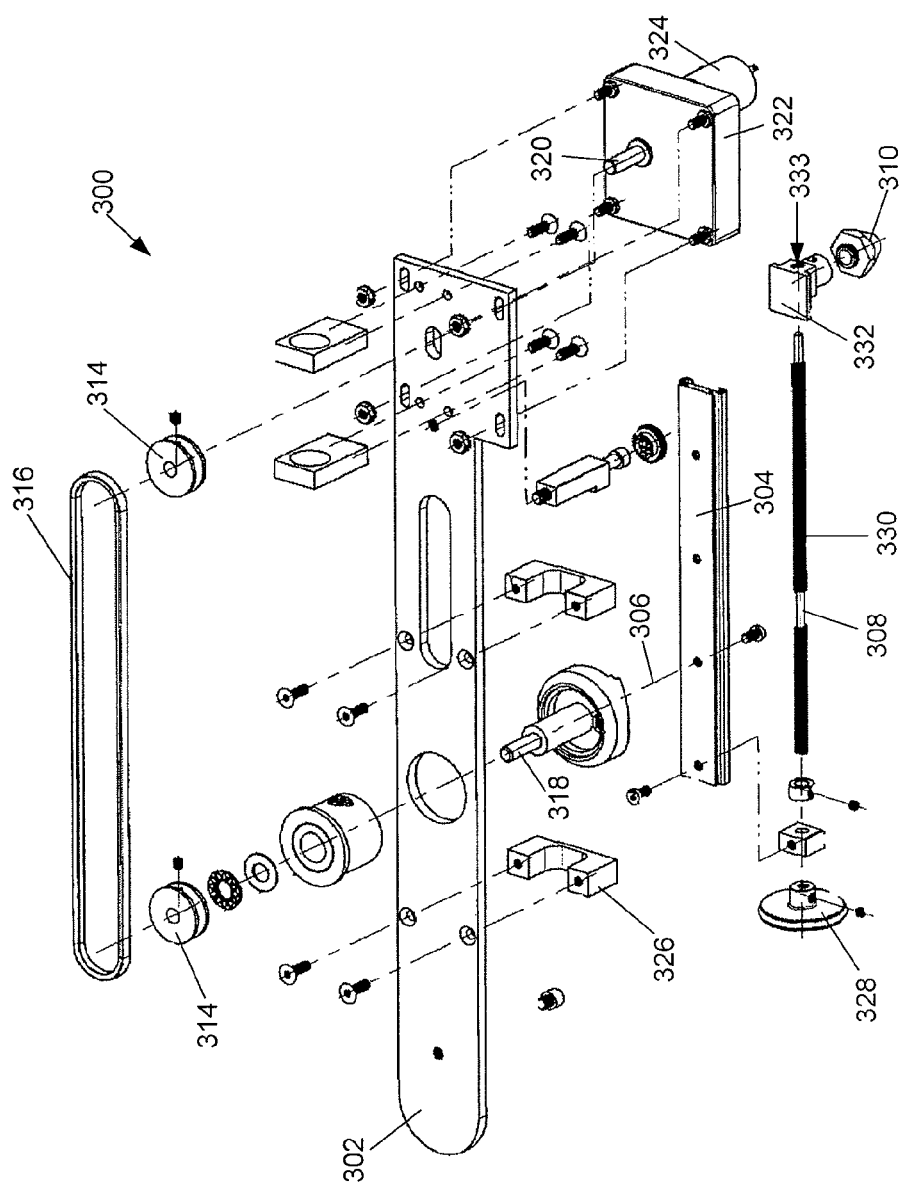
FIG. 3 is an exploded view of the air knife mechanism shown in FIG. 4.

An outline view of the air knife assembly 300 is shown in FIG. 2, and an exploded view is shown in FIG. 3. The air knife assembly 300 includes a base plate 302 that connects to the support bracket 118 (FIG. 1). Suspended below the base plate 302 is a rotatable carrier 304 that can rotate about a rotation axis 306 during operation. When installed over the DPF 102 on the tool 100 (FIG. 1), the rotation axis 306 is arranged to be generally aligned with a centerline of the DPF 102, which in the case of a cylindrically shaped DPF element coincides with the center-points of its cross sectional areas. The rotatable carrier 304 further includes an indexing mechanism 308 which indexes an air nozzle 310 either inwardly toward the rotation axis 306 or outwardly away from the rotation axis 306, i.e., in a radial direction as the rotatable carrier 304 rotates.

Figure 6:
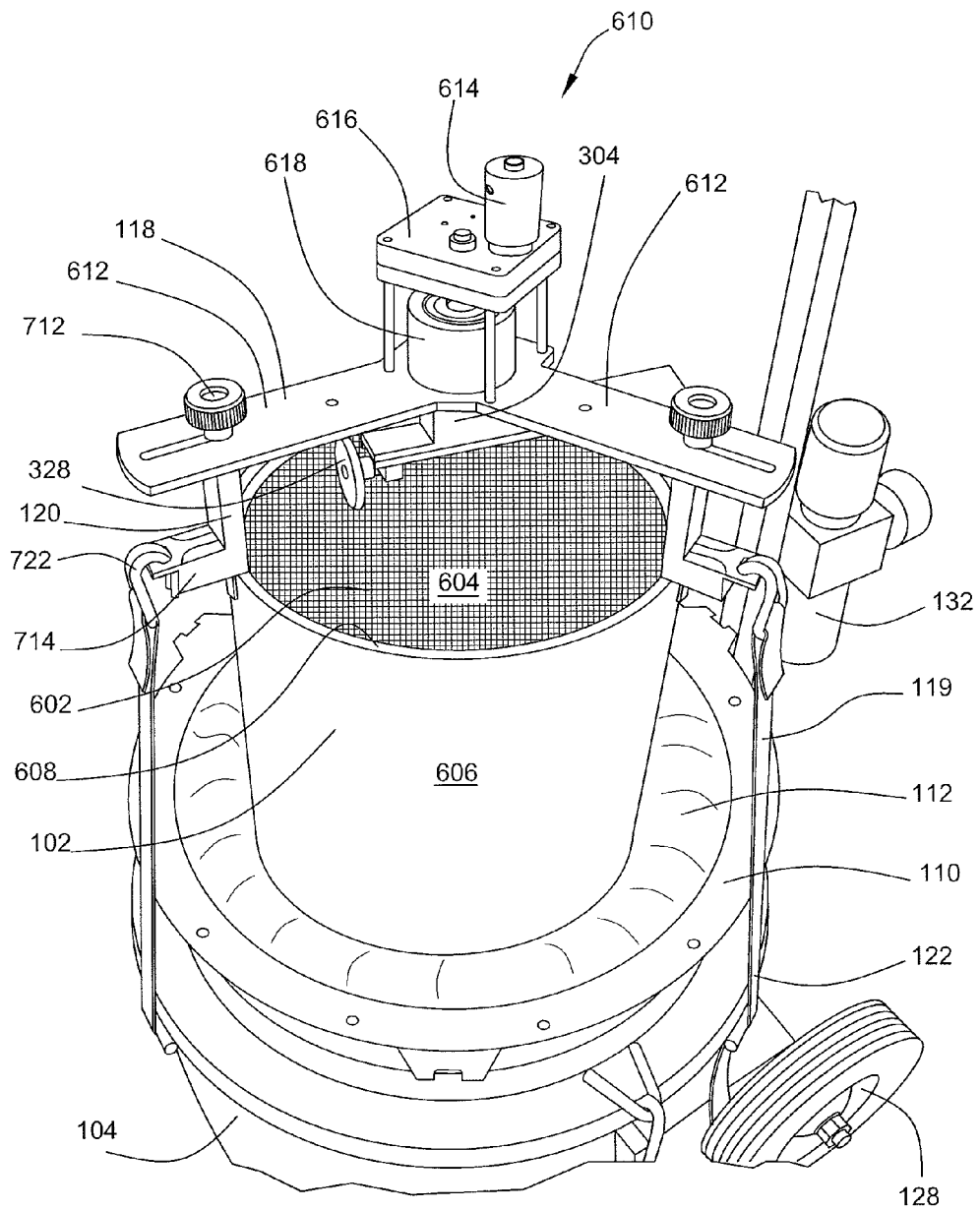
FIG. 6 is a partial outline view of an alternative embodiment in accordance with the disclosure.

Rotation of the rotatable carrier 304 in the illustrated embodiment is provided by a belt drive mechanism 312. Although in this embodiment a belt drive arrangement is shown, other drive arrangements, which include the direct drive arrangement shown in the embodiment of FIG. 6, are contemplated. The belt drive mechanism 312 includes two pulleys 314 that are interconnected by a belt 316. One of the pulleys 314 is disposed around an axle 318 about which the rotatable carrier 304 rotates. The second pulley 314 is connected to the output shaft 320 of a gear set 322 driven by an electric motor 324. Thus, during operation, rotational motion of the output shaft 320 is transferred to cause rotation of the rotatable carrier 304 relative to the base plate 302. In the illustrated embodiment, operational control signals and electrical power to operate the motor 324 are provided by the controller 134 (FIG. 1) via appropriate connections therebetween (not shown).

As the rotatable carrier 304 rotates, friction pads 326 disposed on the base plate 302 at diametrically opposite locations relative to the path of the rotatable carrier 304 contact an indexing wheel 328 twice for each full rotation of the rotatable carrier 304. The indexing wheel 328 is connected to a threaded shaft 330 which extends along the length of the rotatable carrier 304 and is arranged to rotate relative thereto. An air nozzle base block 332 includes a threaded opening 333 (FIG. 3) that is engaged with the threaded shaft 330 and is allowed to move along the length of the rotatable carrier 304. The base block 332 is prevented from rotating relative to the threaded shaft 330 such that rotation of the threaded shaft 330 causes linear motion of the base block 332 along the rotatable carrier 304. Thus, contact of the indexing wheel 328 with the friction pads 326 causes some rotation of the indexing wheel 328, which in turn causes rotation of the threaded shaft 330.

Incremental rotation of the threaded shaft 330 incrementally advances the position of the air nozzle 310 relative to the rotatable carrier 304, which corresponds to a radially inward or outward incremental change in the radial distance of the air nozzle 310 relative to the rotation axis 306. Such incremental radial indexing of the air nozzle ensures that the air nozzle 310 will thoroughly sweep an entire circular area of the DPF 102 (FIG. 1) with repeated rotation and indexing.

As can be appreciated, the path along the face of the DPF 102 that is swept by the air nozzle 310 during operation, given a constant speed of rotation of the rotatable carrier 304 relative to the base plate 302, will provide different dwell times of the air nozzle 310 over areas disposed at different radial distances from the rotation axis 306. For this reason, the rotational speed of the carrier 304 may be adjusted to provide a more consistent dwell time. The rotational or angular speed of the carrier 304 may be adjusted in various ways, for example, the speed may be based on the radial distance of the air nozzle 310 from the rotation axis 306, or it may simply be adjusted based on a count of full rotations performed. In the illustrated embodiment, this adjustment is provided by the controller 134 based on a value of time that is measured from the initiation of the cleaning process that has the air nozzle 310 positioned at a predetermined location along the outer portion of the rotatable carrier 304. A predetermined ramp rate for increase or decrease of the rotational speed of the carrier 304 may be adjusted depending on the desired dwell time of the air nozzle of any given portion of the DPF, the length of the DPF, the diameter of the DPF, the air flow through the air nozzle, the degree of incremental distance indexed, the number of rotations performed by the rotatable carrier 304, and other parameters.

Figure 4:
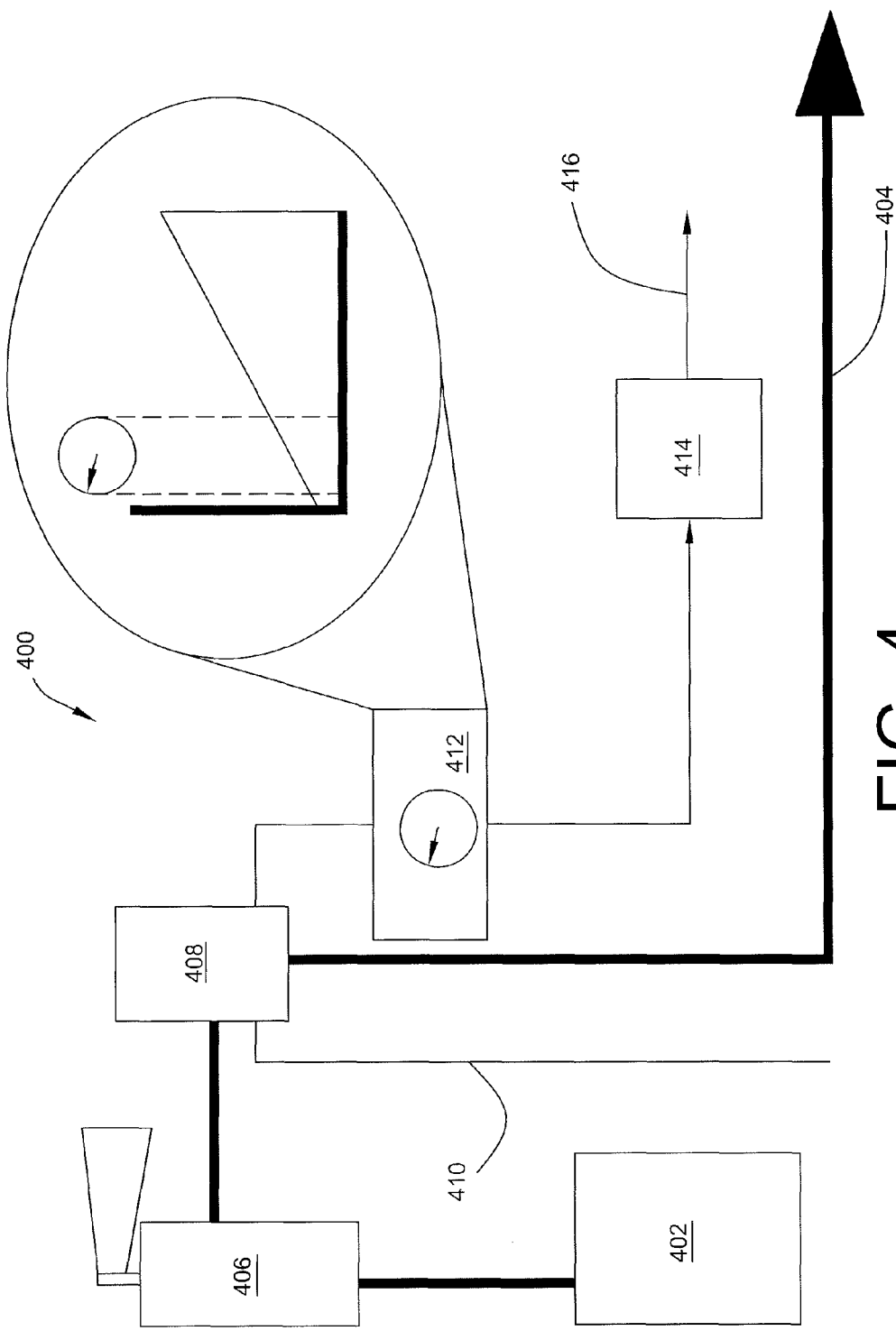
FIG. 4 is a block diagram for a control system in accordance with the disclosure.

A block diagram of a power and control system 400 for use with the tool 100 (FIG. 1) is shown in FIG. 4. The system 400 may be integrated with or be externally connected to the tool 100 as a standalone unit or, alternatively, as a collection of other components carried, for example, by a service truck in the field. The system 400 includes a pressurized air reservoir 402, which supplies air to the air nozzle, for example, the air nozzle 310 (FIG. 3), via an air supply line 404. In the illustrated embodiment, the flow of air from the reservoir 402 to the nozzle of the tool can be controlled by a shut-off valve 406, for example, a ball-type valve, and its pressure may be regulated by a pressure regulator 408. As shown, the pressure regulator 408 may be a pressure switch that ensures that a minimum pressure, for example, 80 psi, is supplied to the air nozzle during operation. This minimum pressure is a pressure adequate to effectively dislodge ash particles from a DPF, but other pressure settings may be used. Moreover, the flow of air may be pulsed by an appropriate device (not shown) disposed in the air stream.

The system 400 further includes a power input 410. The power input 410 may be connected to a 24-volt power source, for example, a battery or generator, and the electrical power thus provided may be used to operate electronic or electrical components of the tool, such as the pressure switch of the pressure regulator 408, an electronic controller 412, a circuit breaker 414, various indicator lights and displays (not shown), and other components.

In the illustrated embodiment, the system 400 includes a motor control output 416. As shown, the motor control output 416 provides an electrical signal that controls the operation and speed of an electric motor operating the rotation of the air nozzle, for example, the electric motor 324 as shown in FIGS. 2 and 3. In alternate embodiments, the motor providing the motion of the air nozzle may be powered by other types of power, such as by use of pneumatic or hydraulic actuators and the like.

The modulation of the motor control signal provided to the motor via the motor control output 416 is provided by the electronic controller 412. As previously described, the speed of rotation of the air nozzle around the face of the DPF may be adjusted while the radial distance of the air nozzle from a center of rotation incrementally changes such that a consistent dwell time of the air nozzle is provided across the entire surface area of the face of the DPF. Such adjustment may be provided by the controller 412 or another appropriate device. In the illustrated embodiment, the controller 412 is a timer that can be set to gradually ramp up the speed of the motor as the air nozzle moves from the center of the face of the DPF toward its outer margins. The timer may be set to one of several predetermined settings that provide an increasing motor current over time. This type of motor control, although simple, is quite effective in providing consistent dwell times for the air nozzle over the various areas on the face of the DPF. It should be appreciated that the adjustment of motor speed over time provides a consistent speed of the air nozzle as it sweeps the various areas of the face of the DPF, and can be adjusted to a specific dwell time depending on the length and diameter of the DPF.

As shown qualitatively in FIG. 4, the controller 412 is arranged to provide an increasing voltage output over time. For purpose of illustration, the voltage output is plotted as a straight line in a graph having time in minutes plotted on its horizontal axis and voltage values plotted on its vertical axis. By setting the diameter size of the DPF by selecting the appropriate setting of the controller 412, the increasing voltage output and process time may be appropriately set.

A partial outline view of an alternative embodiment for a cleaning tool 600 is shown in FIG. 6. In the description that follows, structural features and/or elements that are the same or similar to corresponding features and elements previously described are denoted by the same reference numerals as previously used for simplicity. The illustrated tool 600 includes a catch basin 104 and an adapter collar 110, which are carried by a dolly 122 as previously shown and described. In FIG. 6, the tool 600 has a DPF 102 mounted thereto, secured by straps 119, and engaged with the seal 112.

From the vantage point of the illustration of FIG. 6, a generally flat face 602 of the filter element bundle 604 of the DPF 102 can be seen. The filter element bundle 604 is centrally disposed within the DPF 102 and is surrounded by a filter can 606, which in this case is made of metal and forms a rim 608 that surrounds the filter bundle 604. The rim 608 protrudes axially from the filter element bundle 604 at an offset distance, which may change or be omitted depending on the design of each specific DPF. In this embodiment, the support bracket 118 is supported centrally relative to the filter can 606 and arranged generally parallel to the flat face 602 of filter element bundle 604 by three support legs 120. The legs 120 are arranged to centrally locate the support bracket 120 onto the filter can 606 and to place the support bracket 118 in substantial parallel relation to the flat face 602 of the DPF 102.

Figure 7:
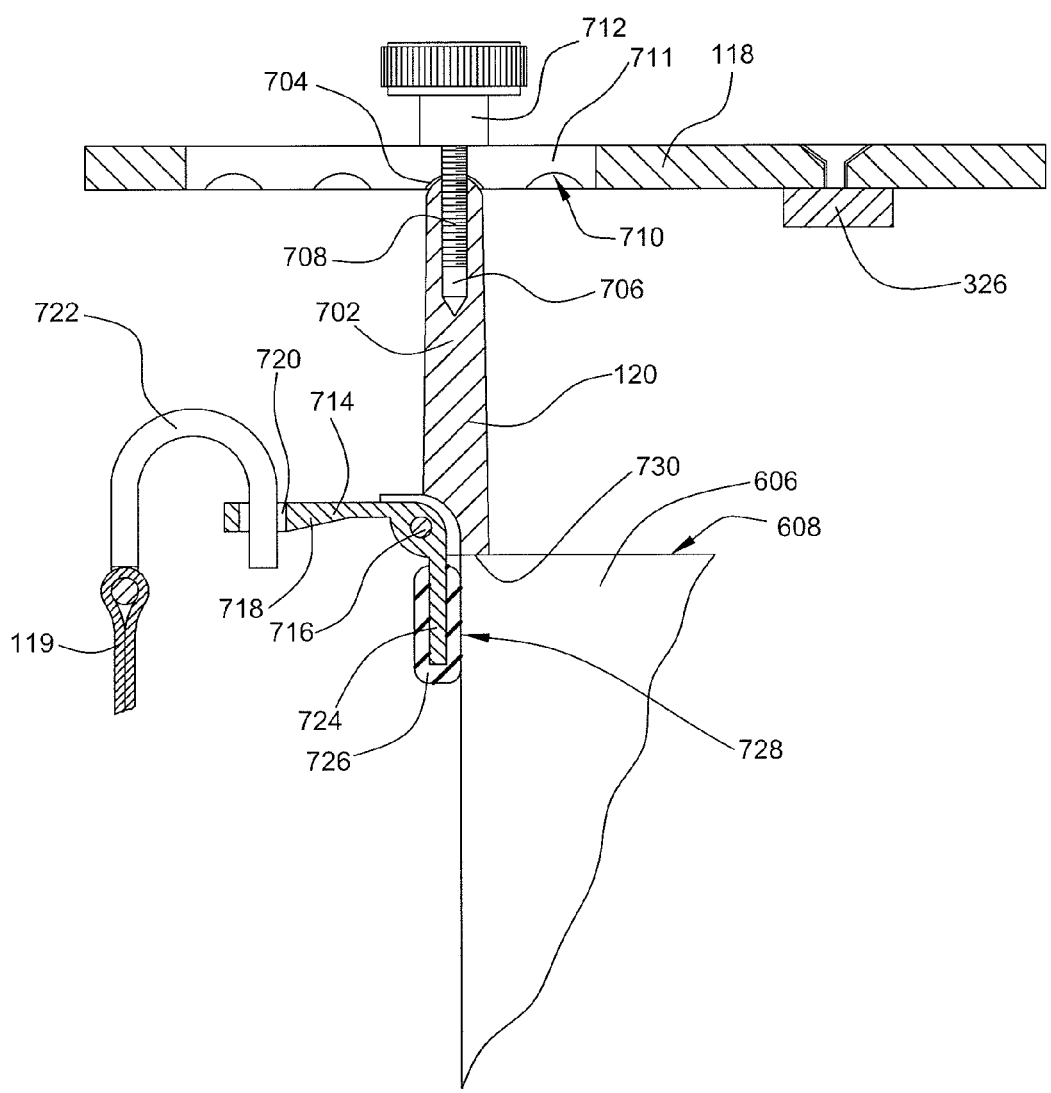
FIG. 7 is a partial cross section of a support leg in accordance with the disclosure.

A detail cross section of one of the legs 120 of the embodiment shown in FIG. 6 is shown in FIG. 7 to highlight certain features of each leg 120. Each support leg 120 includes a support 702 having a generally curved upper portion 704 that forms a threaded opening 706 extending axially through a portion of the support 702. A fastener 708 secures the support 702 to the support bracket 118. In the illustrated embodiment, the radial position of the support 702 relative to the centerline or, generally, a longitudinal axis of symmetry of the DPF 102, is determined by a mating engagement between the curved upper portion 704 of the support 702 with one of a series of notches 710. The notches 710 are formed at predetermined locations along the underside of a portion of the support bracket 118 around an elongate slot 711. It should be appreciated that other mating shapes can be used.

Each of the plurality of notches 710 is arranged to matingly receive and locate the support 702 formed at a predetermined location that corresponds to the radial size or, generally, to an outer dimension of a particular DPF that the tool 600 is arranged to accept. In this way, an operator may pre-arrange the position of each leg 120 onto the support bracket 118, prior to or during the mounting of the DPF onto the tool 600, in such manner that ensures a proper fit. Marks or other indexing information may be printed onto the top face of the support bracket 118 adjacent the notches 710 to facilitate the proper positioning of the legs 120 depending on the size of the DPF that will be mounted or that is mounted on the tool 600. To further facilitate the installation or adjustment of the legs 120, the fastener 708 in the illustrated embodiment includes a knob 712 that permits manual installation of the supports 702 to the support bracket 118.

Although the portion of the support 702 may simply be notched to matingly accept the rim 608 of the can 606 of the DPF, one possible arrangement that can further laterally secure the bracket 118 onto the DPF is shown in the embodiment of FIG. 7. As shown, the support 702 includes a hinge member 714 that is pivotally connected to the support 702 by a pin 716. The hinge member 714 includes a support lever 718 that forms an opening 720 to accept a hook 722 that is disposed at the end of the corresponding strap 119. The hinge member 714 further forms an engagement lever 724 that includes a rubber or, generally, a non-skid coating layer 726, deposited over its free end along an edge 728 that engages the can 606.

When installed, the legs 120 are arranged to constrain the support bracket 118 both axially and laterally relative to the DPF 102. In the embodiment illustrated in FIG. 7, a blunt end 730 of the support 702 abuts the top rim 608 of the can 606 to axially position and constrain the support bracket 118. Lateral positioning and constraint is provided by forces applied by the hinge members 714 when the straps 119 have been secured. More specifically, a tension from each strap 119 is applied to each hinge member 714 and operates to push the engagement lever 724 against the can 606. The non-skid coating layer 726 ensures proper and secure engagement therebetween, and generally constrains the support bracket 118 laterally relative to the DPF 102.

Returning now to FIG. 6, the support bracket 118 is mounted onto the DPF 102. In this embodiment, a direct-drive arrangement 610 that effects rotation of the rotatable carrier 304 is presented. The direct-drive arrangement 610 of the illustrated embodiment is mounted generally centrally onto the support bracket 118, which in this embodiment includes three symmetrically spaced branches 612 (two visible) that are disposed 120 degrees apart. Similar to the belt-drive mechanism 312 (shown in FIG. 2), the direct-drive arrangement 610 includes an electric motor 614 connected to a gear-box 616. An output shaft of the gear-box 616 is connected to a coupling 618 that supports and the rotatable carrier 304 while also providing a passage way for compressed air (not shown) to be provided to the air nozzle (not shown).

Figure 8:
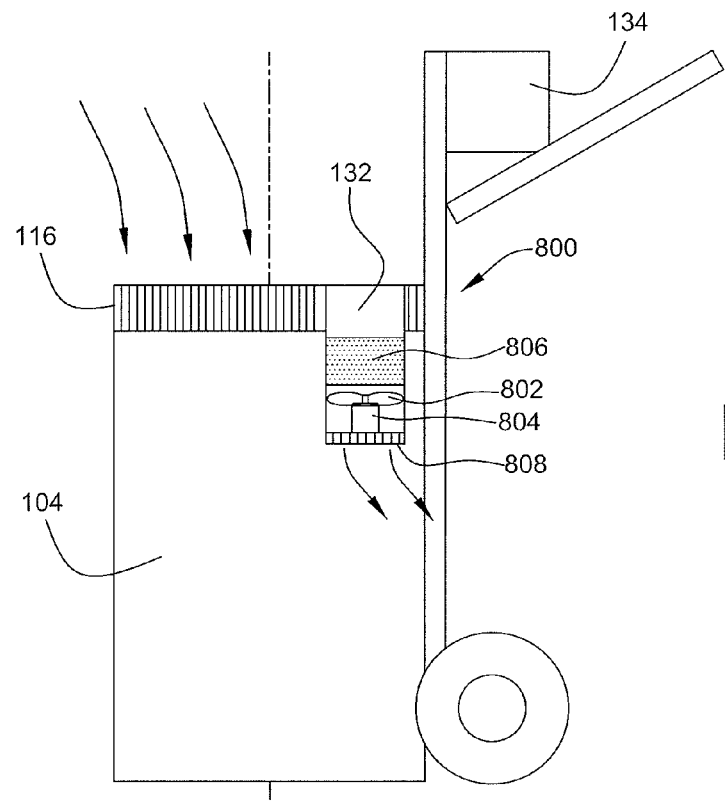
FIGS. 8 and 9 are outline views of a dust suppression system in accordance with the disclosure.
Figure 9:
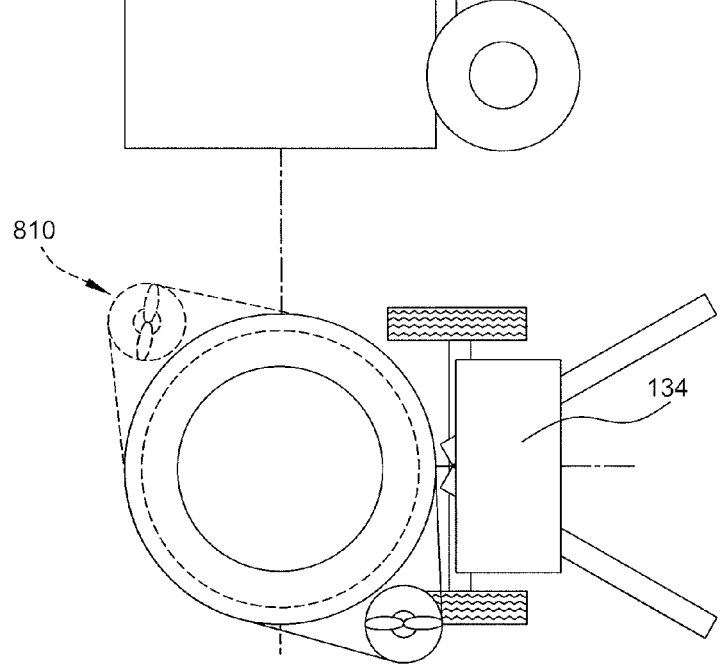

Turning now to FIGS. 8 and 9, an optional dust suppression system 800 is shown connected to the open end of the catch basin 104 of a filter cleaning tool as provided herein. In one embodiment, the dust suppression system 800 may be integrated with the adapter collar 110 as shown, for example, in FIG. 1, or it may alternatively be an add-on component connected directly to the catch basin 104 or disposed above the adapter collar 110. In the illustrated embodiment, the dust suppression system 800 is integrated with a portion of the adapter collar 110 as shown from two perspectives in FIGS. 8 and 9, with certain components removed for clarity.

The dust suppression system 800 includes a fan 802 powered by a motor 804 and disposed downstream of an air-permeable dust collector of filter 806. The motor 804 and fan 802 rest on a platform 808 and, together with the filter 806, are positioned in a sump assembly 810. The sump assembly 810 is associated with the tool in that it is connected, in the illustrated embodiment, to the catch basin 104. In general, the sump assembly 810 is arranged to fluidly communicate with a region surrounding the horizontal tray 116 onto which the DPF rests during the cleaning process, as previously described. In the embodiment shown, the horizontal tray 116 is made of a plurality of short, parallel extending bars, and is enclosed within the outer casing of the adapter collar (not shown).

The dust suppression system 800 collects dust that may be naturally wafting out of the catch basin 104, especially immediately following a completed DPF cleaning process, for example, during and after removal of the treated DPF from the tool. In the embodiment shown, the fan 802 draws air from around the tray 116, which passes through the filter 806 before being expelled. The air pulled by the fan 802 from the region around the tray 116 carries with it a majority of the dust particles wafting from the open end of the catch basin 104. The filter 806 is arranged to collect most such dust, thus enabling the clean operation of the tool. Activation of the dust suppression system 800 may be accomplished manually by the operator and/or automatically by the electronic controller 134, for example, by activating the fan 802 for a predetermined period, such as 3-5 minutes, following completion of a DPF cleaning cycle. A second sump assembly 810 that includes a second fan 802 and filter 806 may optionally be used for improved dust suppression, as illustrated in dashed lines in FIG. 9.

Figure 10:
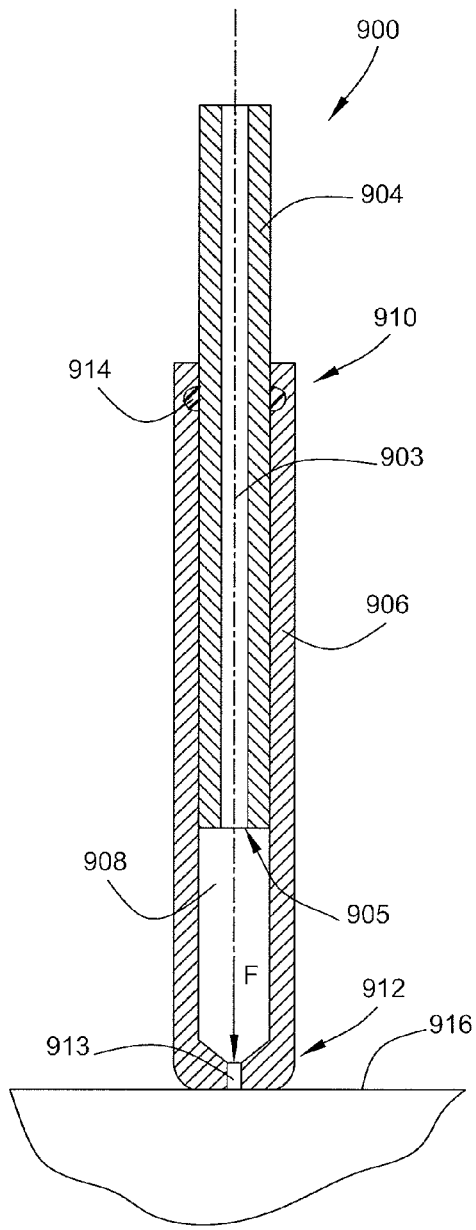
FIGS. 10 and 11 are cross sections of two alternate embodiments of air nozzles in accordance with the disclosure.
Figure 11:
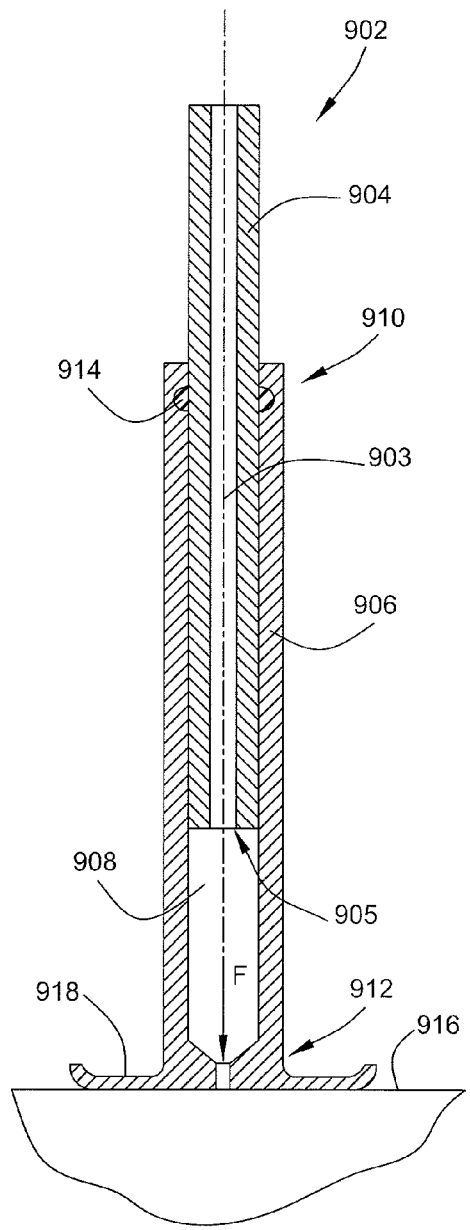

Turning now to FIGS. 10 and 11, two alternative embodiments of the air nozzle 310 (FIG. 2) are illustrated. As shown in FIG. 2, the air nozzle 310 is a rigid member that hovers over the face of the DPF filter bundle as it delivers the stream of air that passes through each filter element and removes the accumulated ash therefrom. In the embodiments of FIGS. 10 and 11, two embodiments of a telescoping air nozzle 900 and 902 are shown. Each of the telescoping air nozzles 900 and 902 may be used in place of the rigid member air nozzle 310 and advantageously provide improved air delivery to the filter elements of the DPF while also reducing noise during operation.

As shown, the telescoping air nozzles 900 and 902 include a transfer pipe 904 that connects to the air nozzle base block 332 (FIG. 3) and that includes an air passage 903 extending therethrough. The transfer pipe 904 in the illustrated embodiments is an elongate tubular member having its first end connected to the base block 332, and its second or free end 905 is disposed at an offset height from the face of the DPF. A telescoping pipe is axially disposed within or in surrounding relation to the transfer pipe 904. As explained below, the telescoping pipe slides relative to the transfer pipe 904.

In the embodiment shown in FIG. 10, the telescoping pipe 906 of the telescoping air nozzle 900 is an elongate tubular member having an internal bore 908 that extends from an open end 910 through a nozzle end 912. The telescoping pipe 906 and the internal bore 908 are generally circular such that, when assembled with the transfer pipe 904, a portion of the transfer pipe 904 adjacent its free end 905 is disposed within the internal bore 908. This or similar arrangements enable the telescoping pipe 906 to slide over the transfer pipe 904 in a telescoping fashion. The nozzle end 912 includes a nozzle opening 913 that fluidly communicates with the internal bore 908 and the air passage 903 to define a path for compressed air provided through the air nozzle base block 332 to exit through the nozzle opening 913. A radial seal 914 is disposed along the sliding interface between the internal bore 908 and the external surface of the transfer pipe 904. This or another similar arrangement between the two components may reduce air leakage along the compressed air path and also retain the two components during installation. To this end, a stop or other feature (not shown) that can restrict the telescoping motion between the two components may optionally be used.

During operation, compressed air provided to the air passage 903 passes through the internal bore 908 and exits through the nozzle opening 913. The pressure and momentum of the air thus provided causes the telescoping extension of the telescoping pipe 906 relative to the transfer pipe 904. More particularly, a force tending to extend the telescoping pipe 906 is provided by the fluid pressure of the air within the internal bore 908, which acts on the end-face of the free end 905 of the transfer pipe 904 and on the surfaces surrounding the nozzle opening 913. The larger normal projected surface area at the end of the internal bore 908 closest to the nozzle end 912 compared to the smaller surface area of the free end 905 yields a net axial force, F, tending to push the telescoping pipe 906 away from the transfer pipe 904 and against the face 916 of the DPF, which is shown generically in the illustrations of FIGS. 10 and 11. In this way, air from the nozzle opening 913 disperses to a lesser extent before entering each individual filter element and noise is reduced during operation as compared to operation with the air nozzle 310 previously shown and described. For example, when operating at a supply air pressure of about 100 psi (690 kPa), a noise level of about 70 dB was measured when the telescoping air nozzle 900 was used.

In the embodiment for the telescoping air nozzle 902 shown in FIG. 11, a sliding pad 918 is connected at the nozzle end 912 of the telescoping pipe 920. As can be appreciated, the sliding contact between the telescoping air nozzles 900 and 902 and the face 916 of the DPF may be hindered by scratches, uneven surfaces, or other physical features present on the face 916, and may further create friction that imparts additional load to the motor driving the rotatable carrier 304 (FIG. 3). To avoid such issues, the sliding pad 918, which may optionally include a low-friction coating on its underside, provides a larger area of contact between the end of the telescoping air nozzle 902 and the face 916 of the DPF, while also providing a shield that reduces noise and blow-back of air from the DPF during operation.

INDUSTRIAL APPLICABILITY

The present disclosure is applicable to a method of removing ash accumulated on a DPF by use of an air nozzle or air knife. In general, the method includes sweeping substantially the entire surface of the DPF with an air nozzle providing a relatively focused or concentrated jet of air through each DPF filter element or passage extending lengthwise along the body of the DPF. The air passing through each filter element causes ash particles accumulated or caked thereon to dislodge and be carried by force of gravity, if the DPF is treated while standing on edge, and by the momentum imparted on them by the air flow passing therethrough, out of the DPF from the end opposite the air nozzle. While one end of the DPF is subjected to the pressurized air flow from an air nozzle, the other end is enclosed to collect the ash being removed. While the larger, heavier ash particles may be collected for later disposal, the smaller, lighter ash particles may become at least temporarily suspended in the agitated air flow exiting the DPF.

By enclosing the outlet end of the DPF, air carrying such suspended particles enters a catch basin of the tool. While the heavier ash particles collect in the catch basin, excess air carrying the lighter ash particles that did not collect in the basin is free to exit from the basin back through the DPF, by passing through filter elements that are not being treated at the time. Advantageously, the relatively high velocity of air from the jet passing through each filter element of the DPF during cleaning, ash and other particulates accumulated thereon are carried away from the DPF, as previously described.

During operation, the stream of air that is carrying the ash out of the filter as the stream transitions from the filter into the catch basin advantageously causes the air stream, and thus the ash particles carried thereby, to decelerate and fall to the bottom of the basin. Thereafter, air having entered and deposited the larger, heavier ash particles in the catch basin can change direction and exit the basin back through the DPF. Because of the relatively large cross sectional area available for flow of air from the catch basin exiting the catch basin through the DPF, the velocity of air exiting the catch basin remains low, and the various filter elements of the DPF the air is passing through collect most of the airborne ash particles. In this fashion, the deceleration of the cleaning stream of air passing through the DPF as it enters the catch basin, and the filtering provided by the DPF being cleaned for air exhausting from the catch basin, essentially provide a two-stage filtering function for the air used to clean the DPF.

Figure 5:
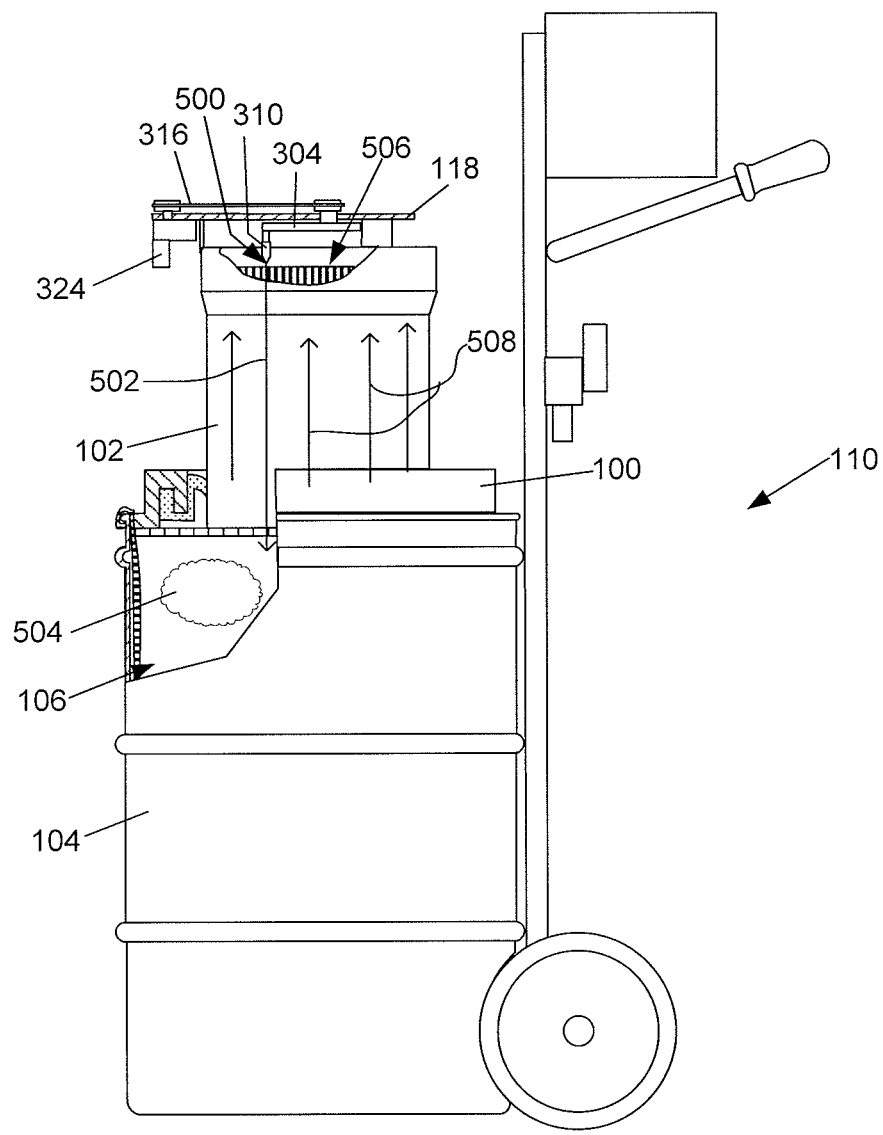
FIG. 5 is a cross section of a tool during operation in accordance with the disclosure.

This reverse filtering function of the DPF is illustrated qualitatively in the partial cross section of FIG. 5, in which structural features and elements that are the same or similar to corresponding features and elements already described are denoted by the same reference numerals as previously used for simplicity. More specifically, and in reference to FIG. 5, the air nozzle 310 is shown in one operating position over a particular filter element 500 of the DPF 102. The flow of air 502 from the nozzle 310 used for cleaning the particular filter element 500 is denoted by an open-head arrow extending in a downward direction. A portion of the ash dislodged from the particular filter element 500 falls into the catch basin 104, as previously described, but a remaining, very small portion of the removed ash which includes the lighter, smaller ash particles thus removed, forms a cloud 504 within the catch basin 104. As can be appreciated, these smaller, lighter ash particles are still large enough to be trapped by the DPF because they were initially trapped by the DPF from the exhaust flow.

The continued supply of air from the cleaning of successive filter elements of the DPF 102 pushes the air within the catch basin 104, and thus the cloud of ash 504, out of the catch basin 104. Given that the catch basin 104 is enclosed except for its end that is open to the lower face of the DPF 102, the cloud of ash 504 wafts out of the catch basin 104 through other filter elements of the DPF 102 in an upward direction as denoted by the open-head arrows 508. As the cloud of ash 504 travels through the DPF 102 in the upward direction 508, the lighter, smaller ash particles are collected by the additional filter elements 506 such that substantially clean and ash-free air is expelled from the top face of the DPF 102.

Use of the DPF itself to filter the ash particles from the ash cloud during cleaning of the DPF is advantageous because it obviates the use of secondary ash particle filtering or removal devices for the cleaning-air exhaust of the tool, which can add cost and complexity to the ash cleaning tool. Moreover, it has been observed that the amount of ash remaining in the DPF following a cleaning process as described herein is negligible.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

We claim:

1. A tool for removing particulate matter from a diesel particulate filter (DPF), the DPF including a filter element bundle enclosed within a can and having first and second axial ends, comprising:
    a container defining a chamber that has an open end;
    a support associated with the open end of the container that is configured to support the first axial end of the DPF and form a seal around an outside surface of the can of the DPF and the chamber of the container when the DPF is disposed on the support; and
    an air nozzle configured to be mounted proximate to the second axial end of the DPF and direct a narrow flow of air through the second axial end, wherein the flow of air passes through at least a portion of the filter element bundle and exits through the first axial end of the DPF into the container, and wherein a remaining portion of the filter element bundle is disposed to filter air exiting from the container back through the open end of the container and the DPF.

2. The tool of claim 1, wherein the air nozzle is associated with an air knife assembly that is mounted on the second axial end of the DPF, the air knife assembly comprising:
    a drive mechanism;
    a carrier configured for relative rotation relative to the DPF by action of the drive mechanism on one of the carrier and the DPF; and
    an air nozzle base block slidably disposed on the carrier;
    wherein the air nozzle is connected to the air nozzle base block such that it sweeps substantially an entire face of the filter bundle as it incrementally slides relative to the carrier during relative rotation of the carrier and the DPF.

3. The tool of claim 2, wherein the air nozzle is a telescoping air nozzle adapted to extend and contact a face of the DPF when air pressure is present.

4. The tool of claim 2, further comprising a nozzle advancement mechanism arranged to incrementally advance an axial position of the air nozzle base block relative to the carrier at predetermined angular positions of the carrier relative to the DPF.

5. The tool of claim 2, further comprising a support bracket connected to the can of the DPF, wherein the drive mechanism is connected to the support bracket and operates to rotate the carrier relative to the DPF, and wherein the carrier is pivotally supported by the support bracket such that the rotatable carrier hovers at an offset distance relative to the bundle of filter elements.

6. The tool of claim 1, wherein the support includes a support tray that is air permeable and arranged to support the first axial end of the DPF thereon.

7. The tool of claim 1, wherein the container is adapted to receive a liner therein that is arranged to collect particulate matter removed from the DPF by the flow of air passing through the filter element bundle.

8. The tool of claim 1, wherein a cleaning air path is defined from the air nozzle, through the second axial end, through at least a portion of the filter element bundle, through the first axial end, and into the container, and wherein an exhaust air path is defined from the container, through the first axial end, through at least a remaining portion of the filter element bundle, and through the second axial end.

* * * * *